United States

[11] 3,601,017

| [72] | Inventors | Gotthard Glatzer<br>Hamburg;<br>Rolf Linde, Wedel/Holstein müllers park 1a,<br>both of, Germany |
|---|---|---|
| [21] | Appl. No. | 878,756 |
| [22] | Filed | Nov. 21, 1969 |
| [45] | Patented | Aug. 24, 1971 |
| [73] | Assignee | U.S. Philips Corporation<br>New York, N.Y. |
| [32] | Priority | Nov. 23, 1968 |
| [33] | | Germany |
| [31] | | P 18 10 627.9 |

[54] METHOD OF SUPPRESSING INTERFERENCE FRINGES IN PHOTOSENSITIVE MATERIAL
8 Claims, 1 Drawing Fig.

[52] U.S. Cl. .................................................. 95/1,
355/2, 96/27, 96/84
[51] Int. Cl. ................................................... G03c 1/84
[50] Field of Search ...................................... 96/84, 27;
355/2; 95/1

[56] References Cited
UNITED STATES PATENTS

| 2,391,127 | 12/1945 | Carver .......................... | 96/84 |
| 3,022,171 | 2/1962 | Ossenbrunner et al. ...... | 96/84 |
| 3,201,249 | 8/1965 | Pierce et al. ................. | 96/84 |
| 3,340,062 | 9/1967 | Hunter, Jr. et al. ........... | 96/84 |

*Primary Examiner*—John M. Horan
*Assistant Examiner*—T. A. Mauro
*Attorney*—Frank R. Trifari ABSTRACT: There is disclosed a method of suppressing unwanted interference fringes which are produced at interfaces of photosensitive information carriers, for example, holograms or interferograms, by reflection of light. The typical carrier of the hologram information consists of a photosensitive layer bounded on one side by air, on the other by a transparent support such as glass.

The recording of interference fringes is produced by two coherent beams which are simultaneously incident on the photosensitive layer. Unwanted interference fringes are removed by the application of an immersion layer to the photosensitive surface or to its transparent support, the thickness of which being varied in time during exposure.

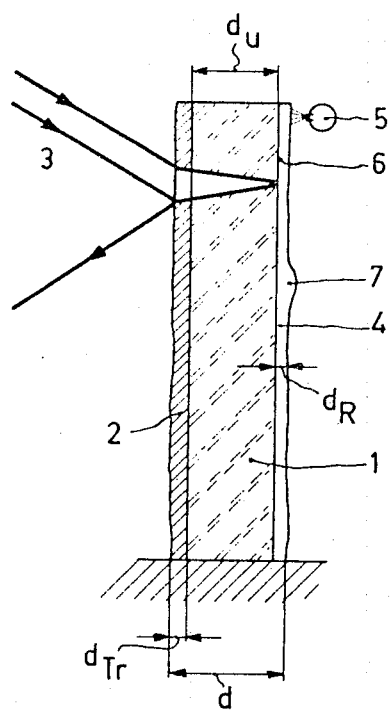

METHOD OF SUPPRESSING INTERFERENCE FRINGES IN PHOTOSENSITIVE MATERIAL

The invention relates to a method of suppressing interference fringes which are produced at interfaces of photosensitive information carriers, for example holograms or interferograms, by the reflection of light.

The carrier of the hologram information generally is a photosensitive layer, for example photogelatin or photochromic glass. This layer has the function of fixing the information as to an incident light intensity distribution, for example in the form of a location dependent density in amplitude holograms and of a location dependent variation of the refractive index or of the layer thickness in phase holograms. The photosensitive layers are transparent and are bounded by air either directly or through a likewise transparent support.

In the usual photographic plate which comprises a layer of gelatin as the information carrier and a glass plate as the support, the layer and the plate generally have approximately equal indexes of refraction and hence together optically form a substantially plane-parallel plate having two interfaces between air and an optically denser medium. When a light is incident on one of the two interfaces, after development there is produced in the photosensitive layer by reflection at the other interface the image of a system of interference fringes as a negative of the visually perceptible intensity distribution. In making holograms these fringes form unwanted information because they are produced by the incidence of a single beam. However, only the recording of interference fringes produced by at least two coherent beams which are simultaneously incident on the photosensitive layer is desired. These are location independent (stationary) interferences which are unambiguously determined by the amplitudes present in the wave fields of the two beams and by the mutual phase relations. In order to obtain optimum contrast of these desired fringes, a matching of the amplitude of an object beam with the amplitude of the reference beam is required, which matching is defined throughout the surface of the gelatin. This matching is prevented by the recording of unwanted fringes, and the overall efficiency of the hologram is reduced because there will be alternately overexposed and underexposed portions of the information carrier.

In the wave front reconstruction of the object the location dependent base density of the layer due to unequal transmission of the exposed hologram acts as a location dependent attenuation of the illuminating beam used. In the process of reconstruction the efficiency of the hologram is again greatly reduced and does not attain the optimum value, neither for amplitude holograms nor for phase holograms.

It is known to use a so-called antihalation coating to avoid troublesome reflections at the interface between the glass support and air. In its simplest form this layer consists in that the support of the emulsion, i.e. the glass plate, is colored grey (grey base), which grey color is not attacked by the processing baths. The required transmission properties of holograms do not allow the use of such a protecting coating. It is further known to use colored gelatin intermediate layers between the emulsion and the support or a colored gelatin backing the color of which disappears after the processing. The absorption of the two latter layers is insufficient to completely prevent light reflections at the interface. Is should be borne in mind that for the large angles of incidence of the reference beam which are required in holography the share of the light reflected at the interface compared with that at normal incidence (angle of incidence equal to zero) is greater.

It is further know to use, for example, an immersion cuvette (Liquid gate) for suppressing the noise level due to the surface roughness of the photographic material and/or to internal secondary reflections. However, the cuvettes are inconvenient to handle and prevent a direct observation of the hologram information. In addition, immersing the photographic material in an immersion agent will cause uncontrollable swelling of the gelatin layer and hence will give rise to other deflects, especially in making holograms.

In contradistinction thereto, the method according to the invention is characterized in that an immersion agent is applied to the surface of the photosensitive information carrier or of its transparent support which is more remote from the direction of light incidence in as far as it is bounded by air, the thickness of the immersion-agent layer being varied in time during exposure. By preventing the immersion agent form immovably adhering to the surface, troublesome interference fringes are completely avoided and the contrast of the hologram information is appreciably increased.

The recording and development of hologram information is not affected at all and the accurate adjustment of the optimum operating point on the density curve remains ensured, whilst the signal-to-noise ratio of the resulting filters for optical information processing purposes is increased. The invention is of particular advantage for microholography (for example the printing of masks for integrated circuit manufacture), where a strong contrast and a high resolving power in the information carrier are required.

The transparent support of, for example, a hologram layer (in photographic plates this support is made of glass) is provided on its surface more remote from the incidence of light with a transparent layer of a liquid, a so-called "cast backing." This layer has the same refractive index as the support (for example glass), thus forming an immersion agent, and a time-variable layer thickness the variation of which causes the above-described system of interference fringes to be shifted through the width of at least one fringe during the exposure time of the hologram. This can be ensured either by means of a highly volatile liquid, as the case may be with the use of a fan heater, or in the case of not so readily evaporating liquids by generating acoustic waves or surface waves which during the reflection directionally modulate the wavefield in the liquid.

Vertical positioning of the plate or the support also enables the production of a liquid film of unequal thickness, which at short intervals can be formed at upper edge of the plate by means of a system of nozzles. The single figure of the drawing shows an embodiment given by way of example. To a vertically arranged plate 1, which may consist of glass, an information carrier 2 of gelatin is applied, which is exposed by incident waves 3. The backing, which consists of an immersion agent 4, is applied to the rear surface 6 of the support 1 by means of a nozzle 5 so that a droplike portion indicated at 7 moves along the rear surface 6, resulting in a variation in time of the thickness $d_R$. Thus, the overall thickness $d$ comprises the constant thickness $d_u$ of the support and the nearly constant thickness $d_{Tr}$ of the information carrier, i.e. of the gelatin layer, and the time-variable thickness $d_R$ of the immersion layer. The transparent immersion agent used for the backing preferably is O-xylene the refractive index of which ($n_x=1.51$) approximates most closely to the refractive indexes of glass ($n_g=1.53$) and of gelatin ($n_{Tr}=1.56$) and which has a high rate of evaporation. The refractive indexes obtain for a temperature of 20° C. and a wavelength $\lambda$ of 633m$\mu$u.

In certain information carriers no separate support is used, for example in the case of a photochromic or phototropic material. The interface between this material and air more remote from the source of exposing radiation then is coated with an immersion agent.

Alternatively, a continuous variation in time and hence a continuous shifting of the fringes is obtainable by the displacement of a wedge-shaped transparent layer which has the same refractive index as the layer, from which it is separated by a liquid immersion agent. This has the same effect as if only a liquid film of unequal depth was provided on the rear surface of the support, i.e. a shifting in time of the system of interference fringes and the obtainment of an average thereof, The immersion agent and the wedges may, in addition, have light-absorbing properties.

What is claimed is:

1. A method of suppressing interference fringes which are produced at interfaces of photosensitive information carriers, for example holograms or interferograms, by the reflection of light, characterized in that an immersion agent is applied to the surface of the photosensitive information carrier or of its transparent support which is more remote from the direction of light incidence in as far as it is bounded by air, the thickness of the immersion agent layer being varied in time during exposure.

2. A method as claimed in claim 1, characterized in that the variation in time of the thickness of the layer is effected by the displacement of a wedge-shaped transparent layer which has the same refractive index and is separated from the support of the information carrier by liquid immersion agent.

3. A method as claimed in claim 1, characterized in that an immersion agent or a wedge is used which in addition has light-absorbing properties.

4. A method as claimed in claim 1, characterized in that the immersion agent used is readily evaporating liquid, while if required a fan heater may be used.

5. A method as claimed in claim 1 characterized in that the immersion agent is O-xylene the refractive index of which is approximately equal to that of the glass of the photographic plate and to that of the photosensitive layer.

6. A method as claimed in claim 1 characterized in that during exposure the immersion agent is directionally modulated by acoustic waves of surface waves.

7. A method as claimed in claim 1 characterized in that the immersion agent is applied to the vertically arranged information carrier or its support by means of a nozzle so that it flows down after the fashion of a drop.

8. A method as claimed in claim 1 characterized in that when a photochromic or phototropic material is used as the information carrier the carrier-air interface move remote from the source of exposing radiation is directly provided with a layer of the immersion agent.